US010630703B1

United States Patent
Ghosh et al.

(10) Patent No.: US 10,630,703 B1
(45) Date of Patent: Apr. 21, 2020

(54) METHODS AND SYSTEM FOR IDENTIFYING RELATIONSHIPS AMONG INFRASTRUCTURE SECURITY-RELATED EVENTS

(71) Applicant: Confluera, Inc., Palo Alto, CA (US)

(72) Inventors: Abhijit Ghosh, Sunnyvale, CA (US); Niloy Mukherjee, San Jose, CA (US); Eun-Gyu Kim, San Carlos, CA (US)

(73) Assignee: Confluera, Inc., Palo Alto, CA (US)

( * ) Notice: Subject to any disclaimer, the term of this patent is extended or adjusted under 35 U.S.C. 154(b) by 0 days.

(21) Appl. No.: 16/521,855

(22) Filed: Jul. 25, 2019

(51) Int. Cl.
*H04L 29/06* (2006.01)
*G06F 21/55* (2013.01)
*G06N 20/00* (2019.01)

(52) U.S. Cl.
CPC ........ *H04L 63/1416* (2013.01); *G06F 21/552* (2013.01); *G06N 20/00* (2019.01); *G06F 2221/034* (2013.01); *H04L 2463/146* (2013.01)

(58) Field of Classification Search
CPC ........... H04L 63/1416; H04L 2463/146; G06F 21/552; G06F 2221/034; G06N 20/00
See application file for complete search history.

(56) References Cited

U.S. PATENT DOCUMENTS

| | | | |
|---|---|---|---|
| 7,890,869 B1 | 2/2011 | Mayer et al. | |
| 9,967,265 B1 | 5/2018 | Peer et al. | |
| 10,102,374 B1 | 10/2018 | Cohen et al. | |
| 10,121,000 B1 | 11/2018 | Rivlin et al. | |
| 10,257,219 B1 | 4/2019 | Geil et al. | |
| 10,389,738 B2 | 8/2019 | Muddu et al. | |
| 10,417,424 B2 | 9/2019 | Cohen et al. | |
| 10,419,450 B2 | 9/2019 | Muddu et al. | |
| 10,425,429 B2 | 9/2019 | Bassett | |
| 2007/0209075 A1 | 9/2007 | Coffman | |
| 2009/0248465 A1 | 10/2009 | Recce | |
| 2010/0257253 A1 | 10/2010 | Saha et al. | |
| 2011/0265182 A1 | 10/2011 | Peinado et al. | |
| 2012/0255003 A1 | 10/2012 | Sallam | |
| 2014/0245376 A1 | 8/2014 | Hibbert et al. | |
| 2014/0359776 A1 | 12/2014 | Liu | |

(Continued)

OTHER PUBLICATIONS https://scholargoogle.comischolar "Monitoring Agent Operating Systems" Sep. 24, 2019.

*Primary Examiner* — Mohammed Waliullah
(74) *Attorney, Agent, or Firm* — Goodwin Procter LLP

(57) ABSTRACT

A novel enterprise security solution allows for precise interception and surgical response to attack progression, in real time, as it occurs across a distributed infrastructure. The solution includes a data monitoring and management framework that continually models system level host and network activities as mutually exclusive infrastructure wide execution sequences and bucketizes them into unique execution trails. A multimodal intelligent security middleware detects indicators of compromise in real-time on top of subsets of each unique execution trail using rule based behavioral analytics, machine learning based anomaly detection, and other sources. Each detection result dynamically contributes to aggregated risk scores at execution trail level granularities. These scores can be used to prioritize and identify highest risk attack trails to end users, along with steps that such end users can perform to mitigate further damage and progression of an attack.

18 Claims, 12 Drawing Sheets

(56) References Cited

U.S. PATENT DOCUMENTS

| | | | |
|---|---|---|---|
| 2015/0074806 A1* | 3/2015 | Roundy | G06F 21/55 |
| | | | 726/23 |
| 2016/0042179 A1 | 2/2016 | Weingarten et al. | |
| 2016/0078365 A1* | 3/2016 | Baumard | G06F 21/552 |
| | | | 706/12 |
| 2016/0099953 A1 | 4/2016 | Hebert et al. | |
| 2016/0191532 A1 | 6/2016 | Seiver et al. | |
| 2016/0205122 A1 | 7/2016 | Bassett | |
| 2016/0217282 A1 | 7/2016 | Vecera et al. | |
| 2016/0371489 A1 | 12/2016 | Puri et al. | |
| 2016/0373481 A1 | 12/2016 | Sultan et al. | |
| 2017/0041338 A1 | 2/2017 | Martini et al. | |
| 2017/0078322 A1 | 3/2017 | Seiver | |
| 2017/0118240 A1 | 4/2017 | Devi Reddy et al. | |
| 2017/0244729 A1 | 8/2017 | Fahrny et al. | |
| 2017/0289187 A1 | 10/2017 | Noel et al. | |
| 2017/0300690 A1* | 10/2017 | Ladnai | G06F 21/554 |
| 2017/0300701 A1 | 10/2017 | Ponta et al. | |
| 2018/0060144 A1 | 3/2018 | Capobianco et al. | |
| 2018/0144138 A1 | 5/2018 | Zhang | |
| 2018/0219888 A1 | 8/2018 | Apostolopoulos | |
| 2018/0316715 A1 | 11/2018 | Liu et al. | |
| 2018/0351991 A1 | 12/2018 | Jones et al. | |
| 2019/0258800 A1* | 8/2019 | Ladnai | G06F 21/554 |

* cited by examiner

METHODS AND SYSTEM FOR IDENTIFYING RELATIONSHIPS AMONG INFRASTRUCTURE SECURITY-RELATED EVENTS

FIELD OF THE INVENTION

The present disclosure relates generally to network security, and, more specifically, to systems and methods for identifying and modeling attack progressions in real-time through enterprise infrastructure or other systems and networks.

BACKGROUND

The primary task of enterprise security is to protect critical assets. These assets include mission critical business applications, customer data, intellectual property and databases residing on-premises or in the cloud. The security industry focuses on protecting these assets by preventing entry through endpoint devices and networks. However, end points are indefensible as they are exposed to many attack vectors such as social engineering, insider threats and malware. With ever increasing mobile workforce and dynamic workloads, the network perimeter also no longer exists. With ever increasing breaches, flaws in enterprise security are exposed on a more frequent basis.

The typical attack timeline on critical infrastructure consists of initial entry, undetected persistence and ultimate damage, with persistence being in a matter of minutes, hours, weeks, or months using sophisticated techniques. However, security solutions focus on two ends of the spectrum: either on entry prevention in hosts and networks, or on ex post facto forensics to identify the root cause. Such retroactive analysis often involves attempts to connect the dots across a plethora of individual weak signals coming from multiple silo sources with potential false positives. As a result, the critical phase during which attacks progress in the system and stealthily change their appearance and scope often remains undetected.

Traditional security solutions are unable to deterministically perform attack progression detection for multiple reasons. These solutions are unimodal, and rely either on artifact signatures (e.g., traditional anti-virus solutions) or simple rules to detect isolated behavioral indicators of compromise. The individual sensors used in these approaches are, by themselves, weak and prone to false positives. An individual alert is too weak a signal to deterministically infer that an attack sequence is in progress. Another reason is that, while an attacker leaves traces of malicious activity, the attack campaign is often spread over a large environment and an extended period of time. Further, the attacker often has the opportunity to remove evidence before a defender can make use of it. Today, security operations teams have to make sense out of a deluge of alerts from many individual sensors not related to each other. Typical incidence response to an alert is onion peeling, a process of drilling down and pivoting from one log to another. This form of connecting the dots looking for an execution trail from a large volume of information is beyond human capacity. Enhanced techniques for intercepting and responding to infrastructure-wide attacks are needed.

BRIEF SUMMARY

In one aspect, a computer-implemented method for identifying infrastructure attacks comprises providing a plurality of software agents configured to monitor system level activities, each software agent being deployed on an operating system within an infrastructure; constructing, by each software agent, based on system level activities monitored by the software agent, an execution graph local to the operating system on which the software agent is deployed, wherein the execution graph comprises one or more local execution trails; and determining a risk score for each local execution trail in the execution graphs. Other aspects of the foregoing including corresponding systems having memories storing instructions executable by a processor, and computer-executable instructions stored on non-transitory computer-readable storage media.

Various implementations of these aspects can include one or more of the following features. The system level activities can include events associated with processes, files, registries, and network connections. The execution graph constructed by a particular one of the software agents can comprise a plurality of nodes and a plurality of edges connecting the nodes, wherein each node represents an entity comprising a process or an artifact, and wherein each edge represents an event associated with an entity. A particular one of the execution graphs can be partitioned into one or more execution trails by identifying sets of nodes and edges in the particular execution graph that each represent a single intent or single unit of work. The execution graphs constructed by the software agents can be received at a central service, which can unify the received execution graphs to form one or more global execution trails, each global execution trail formed from one or more of the local execution trails in the received execution graphs. A risk score can be determined for each of the global execution trails, wherein the risk score for a particular one of the global execution trails is determined based on the risk scores of the local execution trails from which the particular global execution trail is formed. Determining the risk score for the particular global execution trail can include combining the risk scores of the local execution trails from which the particular global execution trail is formed. A visualization of the global execution trails and the risk scores determined for the global execution trails can be provided. The risk score for the particular global execution trail can be updated upon determining that one or more risk scores of the local execution trails from which the particular global execution trail is formed have changed. Each global execution trail can represent a single intent or single unit of work with respect to the infrastructure.

In another aspect, a computer-implemented method for identifying relationships among infrastructure security-related events comprises monitoring, by a plurality of software agents deployed on respective operating systems in an infrastructure, system level activities associated with the respective operating systems; and constructing, based on the system level activities, an execution graph comprising one or more execution trails, wherein the constructing comprises: creating a first node in the execution graph representing a first entity monitored by one of the software agents; creating a second node in the execution graph representing a second entity monitored by one of the software agents; identifying, based on the monitored system level activities, a relationship between the first entity and the second entity; and recording the relationship as an edge between the first node and the second node in the execution graph. Other aspects of the foregoing including corresponding systems having memories storing instructions executable by a processor, and computer-executable instructions stored on non-transitory computer-readable storage media.

Various implementations of these aspects can include one or more of the following features. The execution graph can include a plurality of nodes and a plurality of edges connecting the nodes, wherein each node represents an entity comprising a process or an artifact, and wherein each edge represents an event associated with an entity. A plurality of edges in the execution graph can be atomic such that there is a one-to-one mapping between each such edge and a system call identified in the system level activities. A plurality of edges in the execution graph can be implied in that each such edge is created following the observation of a predefined set of events. The system level activities can comprise (i) systems calls to initiate connections and (ii) system calls to accept connections. The first entity can comprise a first process, wherein the second entity comprises a second process, and wherein identifying the relationship between the first entity and the second entity can comprise: identifying, by one of the software agents, a first system call to initiate a connection by the first process; identifying, by one of the software agents, a second system call to accept a connection by the second process; and matching, based on the first system call and the second system call, the connection initiated by the first process and the connection accepted by the second process. The connection can comprise a network connection between the first process executing on a first one of the operating systems and the second process executing on a second one of the operating systems. The connection can comprise a local connection between the first process and the second process each executing on a same operating system. Identifying the relationship between the first entity and the second entity can comprise determining that a parent process has handed off, to a child process, a connection accepted by the parent process. Identifying the relationship between the first entity and the second entity can comprise determining that one thread has taken over a connection accepted by a different thread.

In another aspect, a computer-implemented method for characterizing infrastructure security-related events comprises monitoring, by a plurality of software agents deployed on respective operating systems in an infrastructure, system level activities associated with the respective operating systems; constructing an execution graph based on the system level activities; and partitioning the execution graph into a plurality of execution trails, wherein the partitioning comprises: identifying a first node in the execution graph, wherein the first node represents a process on one of the operating systems; and upon determining that the process satisfies a condition, defining the first node as a convergence point in the execution graph from which one or more of the execution trails branches. Other aspects of the foregoing including corresponding systems having memories storing instructions executable by a processor, and computer-executable instructions stored on non-transitory computer-readable storage media.

Various implementations of these aspects can include one or more of the following features. The execution graph can comprise a plurality of nodes and a plurality of edges connecting the nodes, wherein each node represents an entity comprising a process or an artifact, and wherein each edge represents an event associated with an entity. Each execution trail can represent a single intent or a single unit of work. Determining that the process satisfies a condition can comprise determining that the process is owned directly by an initialization process of the operating system. Determining that the process satisfies a condition can comprise determining that the process has accepted a connection. A risk score for each of the execution trails can be calculated. Calculating a risk score for one of the execution trails can comprise applying a set of rules to system level activities represented by nodes and edges in the execution trail. The set of rules can comprise match conditions corresponding to risk scores, wherein a particular match condition determines (i) whether frequency of an activity meets a threshold, (ii) whether an edge in the execution trail matches a particular behavior, (iii) whether a path in the execution trail matches a particular behavior, and/or (iv) whether the execution trail contains particular elements. Calculating the risk score for the execution trail can further comprise combining risk scores resulting from applying the set of rules to different portions of the execution trail. One of the execution trails can comprise an execution trail local to one of the operating systems. A global execution trail is formed by connecting the execution trail to other execution trails that are local to other ones of the operating systems.

In another aspect, a computer-implemented method for tracking security risks over infrastructure comprises monitoring, by a plurality of software agents deployed on respective operating systems in an infrastructure, system level activities associated with the respective operating systems; constructing, based on the system level activities, an execution graph comprising a plurality of execution trails, each execution trail having an associated risk score; determining that an influence relationship exists between a first one of the execution trails and a second one of the execution trails; and modifying the risk score associated with the second execution trail based on the influence relationship and the first execution trail. Other aspects of the foregoing including corresponding systems having memories storing instructions executable by a processor, and computer-executable instructions stored on non-transitory computer-readable storage media.

Various implementations of these aspects can include one or more of the following features. The execution graph can comprise a plurality of nodes and a plurality of edges connecting the nodes, wherein each node represents an entity comprising a process or an artifact, and wherein each edge represents an event associated with an entity. Each execution trail can represent a single intent or a single unit of work. Determining that the influence relationship exists can comprise determining that the second execution trail has performed an action with respect to an artifact in the first execution trail. The artifact can comprise a file created in the first execution trail, and the action can comprise (i) executing the file or (ii) opening the file. Modifying the risk score associated with the second execution trail can comprise calculating a weighted moving average using, as input, the risk score associated with the second execution trail and a risk score associated with an artifact in the first execution trail. Constructing the execution graph can comprise constructing the first execution trail, and constructing the first execution trail can comprise: identifying creation or modification of an artifact in the first execution trail; and calculating a risk score for the artifact based on the risk score associated with the first execution trail. Calculating the risk score for the artifact can be further based on a risk momentum value comprising a combination of risk scores associated with preceding execution trails linked to the first execution trail. The risk score for the artifact can be calculated as a sum of the risk score associated with the first execution trail and the risk momentum value, multiplied by a weighting factor.

In another aspect, a computer-implemented method for detecting behavioral indicators of compromise in an infrastructure comprises monitoring, by a software agent deployed on an operating system in an infrastructure, system level activities associated with the operating system; constructing, based on the system level activities, an execution graph comprising a plurality of execution trails; and identifying one or more indicators of compromise within the execution graph based on detection results received from a plurality of sources. Other aspects of the foregoing including corresponding systems having memories storing instructions executable by a processor, and computer-executable instructions stored on non-transitory computer-readable storage media.

Various implementations of these aspects can include one or more of the following features. The execution graph can comprise a plurality of nodes and a plurality of edges connecting the nodes, wherein each node represents an entity comprising a process or an artifact, and wherein each edge represents an event associated with an entity. Identifying the one or more indicators of compromise can comprise calculating risk scores for the execution trails and determining whether an indicator of compromise exists based on the risk scores. The detection results received from the plurality of sources can be applied to the execution graph and the risk scores updated based thereon. Identifying the one or more indicators of compromise can comprise applying a set of rules to the execution graph, each rule comprising one or more conditional expressions that identify system level behaviors. One of the rules can comprise an expression to identify an event between entities represented by nodes in the execution graph. One of the rules can comprise an expression to identify whether an event meets a frequency threshold. One of the rules can comprise a plurality of expressions that identify a set of behaviors based on a subset of events occurring in one of the execution trails. One of the rules can comprise a plurality of expressions that identify a set of behaviors based on a subset of events occurring across a plurality of the execution trails. The plurality of sources can comprise (i) rule based online graph processing analytics, (ii) machine learning based anomaly detection, (iii) security events reported from host operating systems, (iv) external threat intelligence feeds, and/or (v) pre-existing silo security solutions in the infrastructure.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

Figure 1:
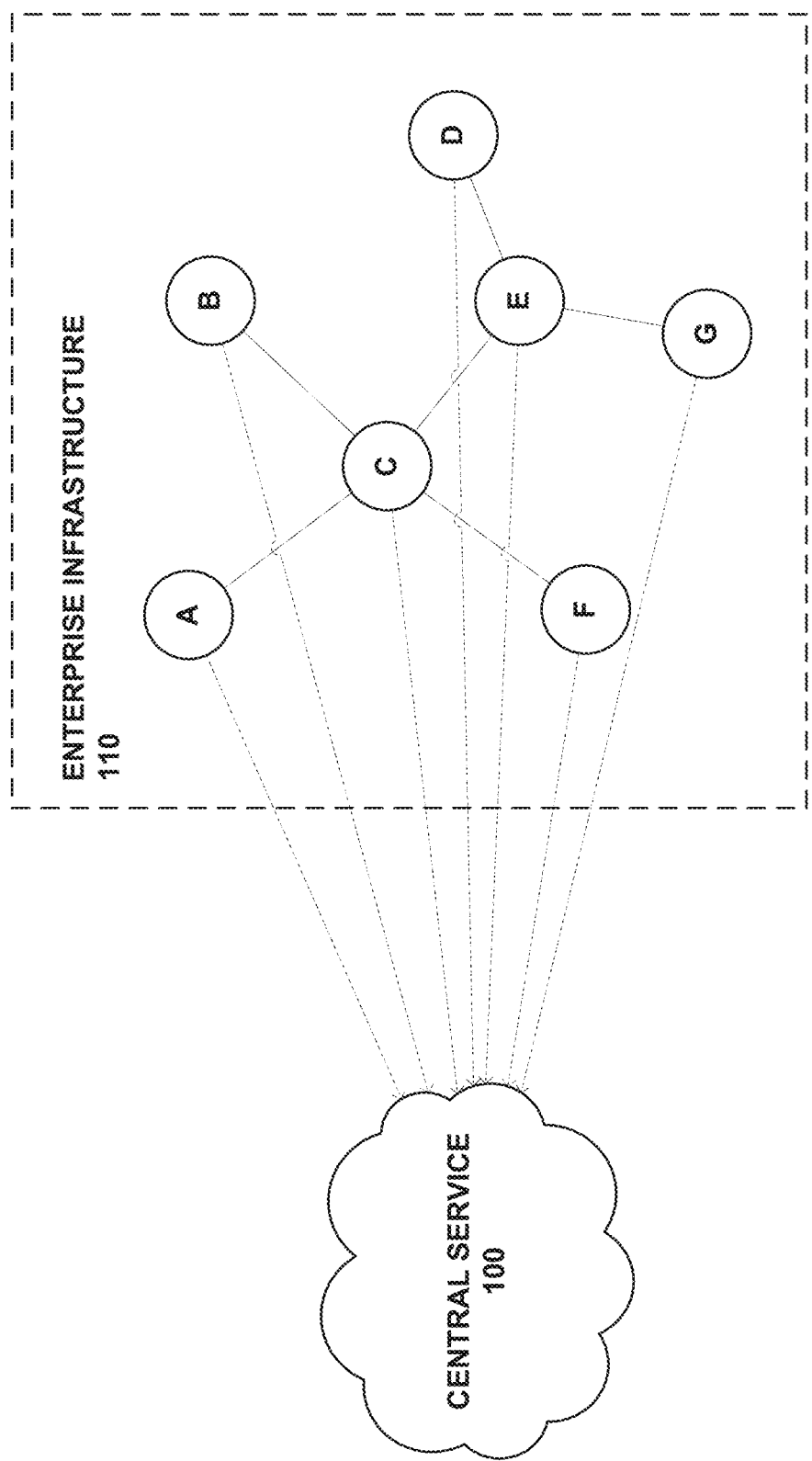
FIG. 1 depicts an example high-level system architecture for an attack progression tracking system including agents and a central service.

Described herein is a unique enterprise security solution that provides for precise interception and surgical response to attack progression, in real time, as it occurs across a distributed infrastructure, whether aggressively in seconds or minutes, or slowly and steadily over hours, days, weeks, months, or longer. The solution achieves this through a novel data monitoring and management framework that continually models system level host and network activities as mutually exclusive infrastructure wide execution sequences, and bucketizes them into unique execution trails. A multimodal intelligent security middleware detects indicators of compromise (IoC) in real-time on top of subsets of each unique execution trail using rule based behavioral analytics, machine learning based anomaly detection, and other sources described further herein. Each such detection result dynamically contributes to aggregated risk scores at execution trail level granularities. These scores can be used to prioritize and identify highest risk attack trails to end users, along with steps that such end users can perform to mitigate further damage and progression of an attack.

In one implementation, the proposed solution incorporates the following primary features, which are described in further detail below: (1) distributed, high-volume, multi-dimensional (e.g., process, operating system, network) execution trail tracking in real time within hosts, as well as across hosts, within an infrastructure (e.g., an enterprise network); (2) determination of indicators of compromise and assignment of risk on system level entities, individual system level events, or clusters of system level events within execution trails, using behavioral anomaly based detection functions based on rule-based behavioral analytics and learned behavior from observations of user environments; (3) evaluation and iterative re-evaluation of risk of execution trails as they demonstrate multiple indicators of compromise over a timeline; and (4) concise real-time visualization of execution trails, including characterizations of the trails in terms of risk, and descriptions relating to posture, reasons for risk, and recommendations for actions to mitigate identified risks.

The techniques described herein provide numerous benefits to enterprise security. In one instance, such techniques facilitate clear visualization of the complete "storyline" of an attack progression in real-time, including its origination, movement through enterprise infrastructure, and current state. Security operations teams are then able to gauge the complete security posture of the enterprise environment. As another example benefit, the present solution eliminates the painstaking experience of top-down wading through deluges of security alerts, replacing that experience instead with real-time visualization of attack progressions, built from the bottom up. Further, the solution provides machine-based comprehension of attack progressions at fine granularity, which enables automated, surgical responses to attacks. Such responses are not only preventive to stop attack progression, but are also adaptive, such that they are able to dynamically increase scrutiny as the attack progression crosses threat thresholds. Accordingly, armed with a clear visualization of a security posture spanning an entire enterprise environment, security analysts can observe all weaknesses that an attack has taken advantage of, and use this information to bolster defenses in a meaningful way.

As used herein, these terms have the following meanings, except where context dictates otherwise.

"Agent" or sensor" refers to a privileged process executing on a host (or virtual machine) that instruments system level activities (set of events) generated by an operating system or other software on the host (or virtual machine).

"Hub" or "central service" refers to a centralized processing system, service, or cluster which is a consolidation point for events and other information generated and collected by the agents.

"Execution graph" refers to a directed graph, generated by an agent and/or the hub, comprising nodes (vertices) that represent entities, and edges connecting nodes in the graph, where the edges represent events or actions that are associated with one or more of the nodes to which the edges are connected. Edges can represent relationships between two entities, e.g., two processes, a process and a file, a process and a network socket, a process and a registry, and so on.

"Entity" refers to a process or an artifact (e.g., file, directory, registry, socket, pipe, character device, block device, or other type).

"Event" or "action" refers to a system level or application level event or action that can be associated with an entity, and can include events such as create directory, open file, modify data in a file, delete file, copy data in a file, execute process, connect on a socket, accept connection on a socket, fork process, create thread, execute thread, start/stop thread, send/receive data through socket or device, and so on.

"System events" or "system level activities" and variations thereof refer to events that are generated by an operating system at a host, including, but not limited to, system calls.

"Execution trail" refers to a partition or subgraph of an execution graph, typically isolated by a single intent or a single unit of work. For example, an execution trail can be a partitioned graph representing a single SSH session, or a set of activities that is performed for a single database connection.

"Attacker" refers to an actor (e.g., a hacker, team of individuals, software program, etc.) with the intent or appearance of intent to perform unauthorized or malicious activities. Such attackers may infiltrate an enterprise infrastructure, secretly navigate a network, and access or harm critical assets.

System Architecture

In one implementation, a deterministic system facilitates observing and addressing security problems with powerful, real-time, structured data. The system generates execution graphs by deploying agents across an enterprise infrastructure. Each agent instruments the local system events generated from the host and converts them to graph vertices and edges that are then consumed by a central processing cluster, or hub. Using the relationships and attributes of the execution graph, the central processing cluster can effectively extract meaningful security contexts from events occurring across the infrastructure.

FIG. 1 depicts one implementation of the foregoing system, which includes two primary components: a central service 100 and a distributed fabric of agents (sensors) A-G deployed on guest operating systems across an enterprise infrastructure 110. For purposes of illustration, the enterprise infrastructure 110 includes seven agents A-G connected in a network (depicted by solid lines). However, one will appreciate that an enterprise infrastructure can include tens, hundreds, or thousands of computing systems (desktops, laptops, mobile devices, etc.) connected by local area networks, wide area networks, and other communication methods. The agents A-G also communicate using such methods with central service 100 (depicted by dotted lines). Central service 100 can be situated inside or outside of the enterprise infrastructure 110.

Figure 2:
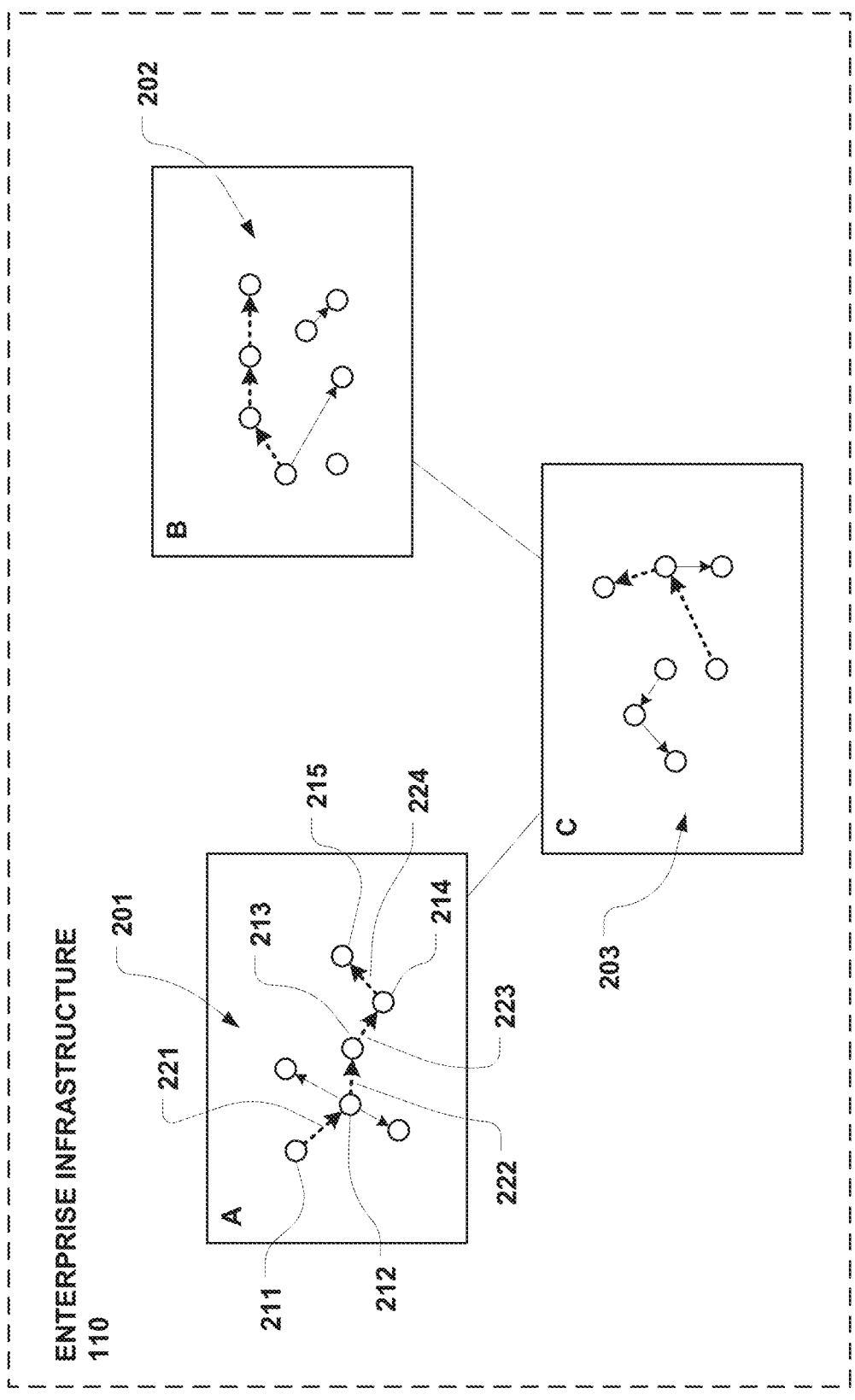
FIG. 2 depicts an example of local execution graphs created by agents executing on hosts in an enterprise infrastructure.

Each agent A-G monitors system level activities in terms of entities and events (e.g., operating system processes, files, network connections, system calls, and so on) and creates, based on the system level activities, an execution graph local to the operating system on which the agent executes. For purposes of illustration, FIG. 2 depicts simplified local execution graphs 201, 202, 203 respectively created by agents A-C within enterprise infrastructure 110. Local execution graph 201, for example, includes a local execution trail (represented by a bold dashed line), which includes nodes 211, 212, 213, 214, and 215, connected by edges 221, 222, 223, and 224. Other local execution trails are similarly represented by bold dashed lines within local execution graphs 202 and 203 created by agents B and C, respectively.

The local execution graphs created by the agents A-G are sent to the central service 100 (e.g., using a publisher-subscriber framework, where a particular agent publishes its local execution graph or updates thereto to the subscribing central service 100). In some instances, the local execution graphs are compacted and/or filtered prior to being sent to the central service 100. The central service consumes local execution graphs from a multitude of agents (such as agents A-G), performs in-memory processing of such graphs to determine indicators of compromise, and persists them in an online data store. Such data store can be, for example, a distributed flexible schema online data store. As and when chains of execution perform lateral movement between multiple operating systems, the central service 100 performs stateful unification of graphs originating from individual agents to achieve infrastructure wide execution trail continuation. The central service 100 can also include an application programming interface (API) server that communicates risk information associated with execution trails (e.g., risk scores for execution trails at various granularities).

Figure 3:
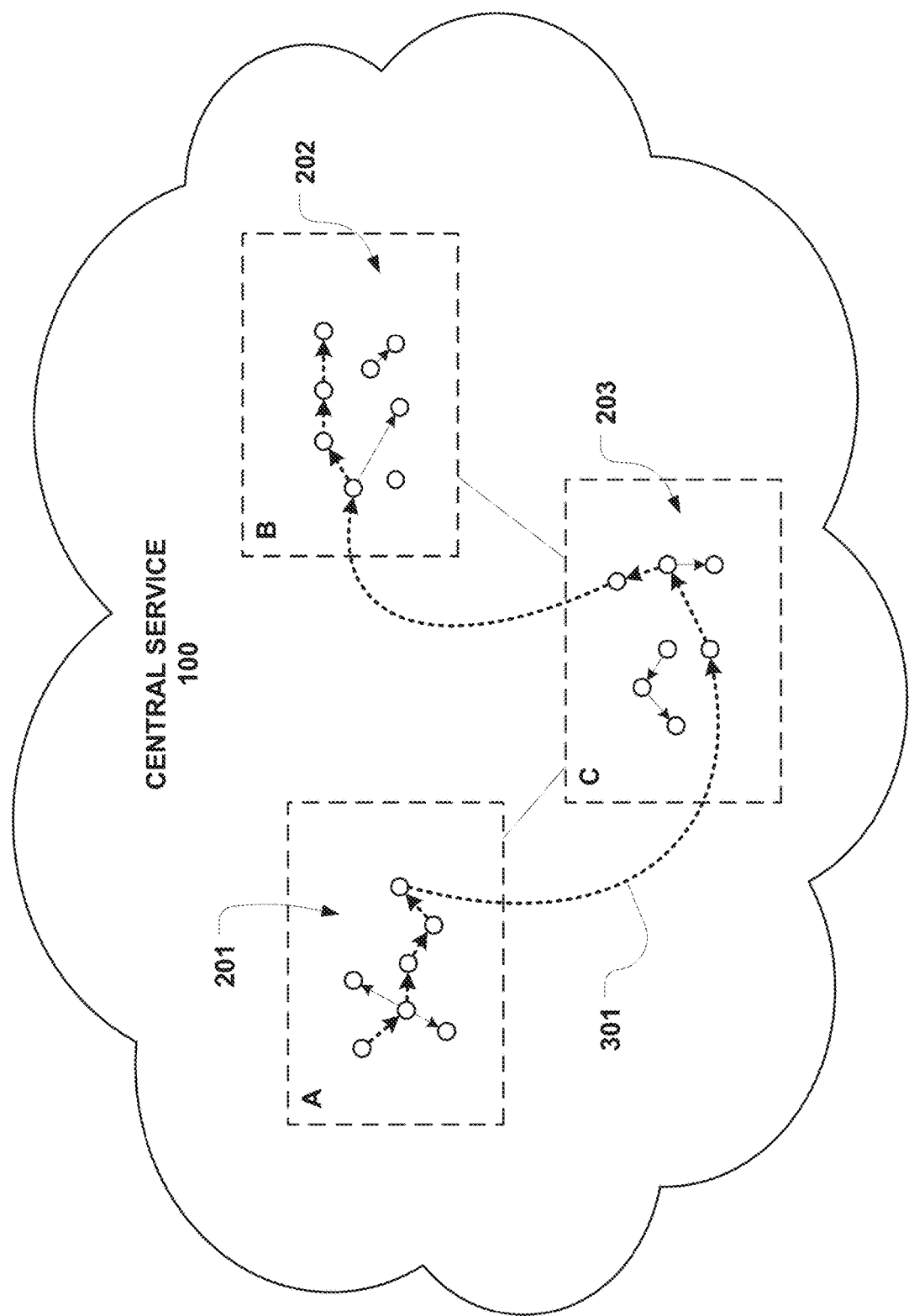
FIG. 3 depicts the local execution graphs of FIG. 2 connected at a central service to form a global execution graph.

FIG. 3 depicts local execution graphs 201, 202, and 203 from FIG. 2, following their receipt at the central service 100 and merger into a global execution graph. In this example, the local execution trails depicted in bold dashed lines in local execution graphs 201, 202, 203 are determined to be related and, thus, as part of the merger of the graphs 201, 202, 203, the local execution trails are connected into a continuous global execution trail 301 spanning across multiple operating systems in the infrastructure.

Figure 4:
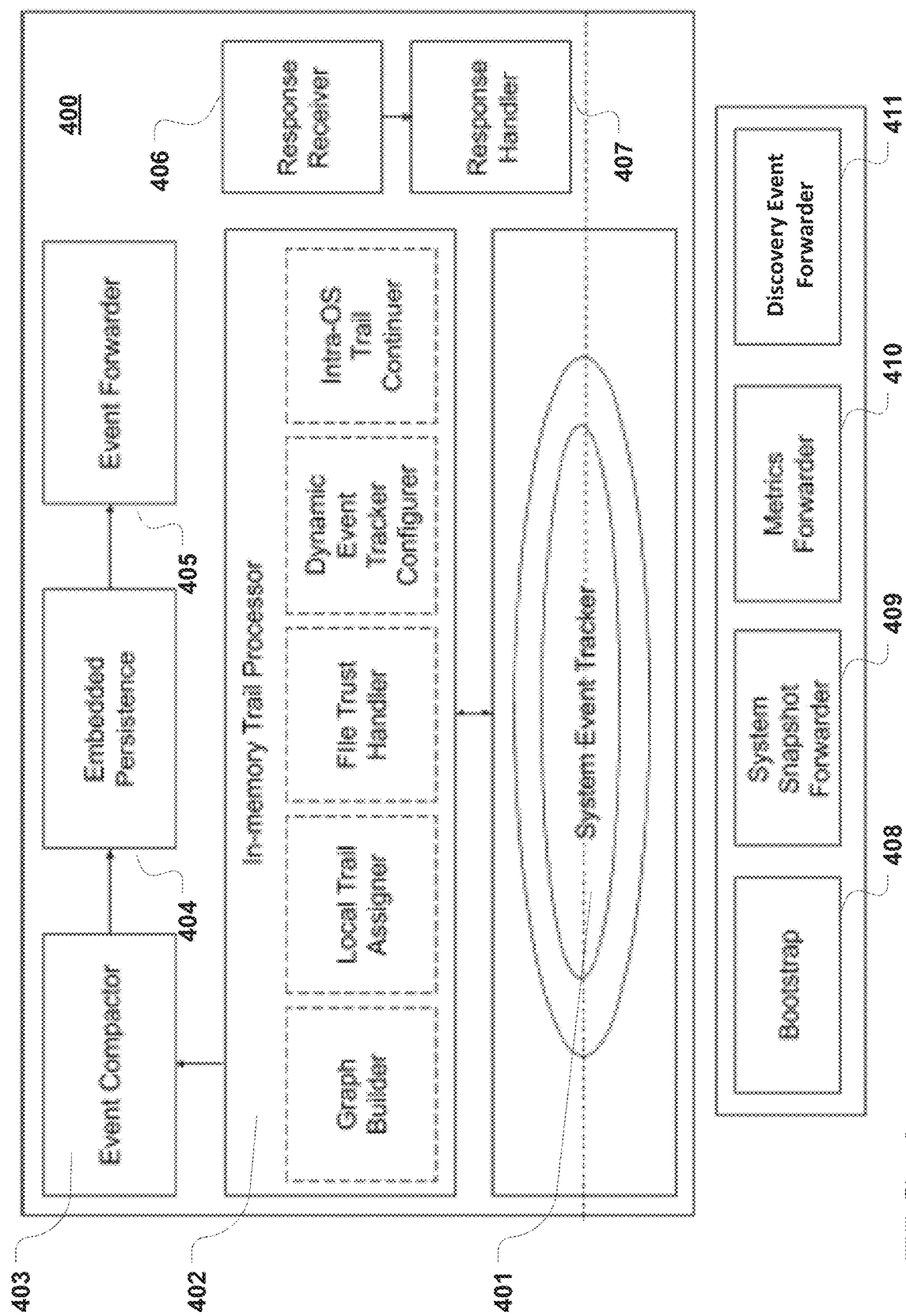
FIG. 4 depicts one implementation of an agent architecture in an attack progression tracking system

FIG. 4 depicts an example architecture of an agent 400, according to one implementation, in which a modular approach is taken to allow for the enabling and disabling of granular features on different environments. The modules of the agent 400 will now be described.

System Event Tracker 401 is responsible for monitoring systems entities, such as processes, local files, network files, and network sockets, and events, such as process creation, execution, artifact manipulation, and so on, from the host operating system. In the case of the Linux operating system, for example, events are tracked via an engineered, high-performance, lightweight, scaled-up kernel module that produces relevant system call activities in kernel ring buffers that are shared with user space consumers. The kernel module has the capability to filter and aggregate system calls based on static configurations, as well as dynamic configurations, communicated from other agent user space components.

In-memory Trail Processor 402 performs numerous functions in user space while maintaining memory footprint constraints on the host, including consuming events from System Event Tracker 401, assigning unique local trail identifiers to the consumed events, and building entity relationships from the consumed events. The relationships are built into a graph, where local trail nodes can represent processes and artifacts (e.g., files, directories, network sockets, character devices, etc.) and local trail edges can represent events (e.g., process triggered by process (fork, execve, exit); artifact generated by process (e.g., connect, open/ O_CREATE); process uses artifact (e.g., accept, open, load)). The In-memory Trail Processor 402 can further perform file trust computation, dynamic reconfiguration of the System Event Tracker 401, and connecting execution graphs to identify intra-host trail continuation. Such trail continuation can include direct continuation due to intra-host process communication, as well as indirect setting membership of intra-host trails based on file/directory manipulation (e.g., a process in trail A uses a file generated by trail B).

Event Compactor 403 is an in-memory graph compactor that assists in reducing the volume of graph events that are forwarded to the central service 100. The Event Compactor 403, along with the System Event Tracker 401, is responsible for event flow control from the agent 400. Embedded Persistence 404 assists with faster recovery of In-memory Trail Processor 402 on user space failures, maintaining constraints of storage footprint on the host. Event Forwarder 405 forwards events transactionally in a monotonically increasing sequence from In-memory Trail Processor 402 to central service 100 through a publisher/subscriber broker. Response Receiver 406 receives response events from the central service 100, and Response Handler 407 addresses such response events.

In addition to the foregoing primary components, agent 400 includes auxiliary components including Bootstrap 408, which bootstraps the agent 400 after deployment and/or recovery, as well as collects an initial snapshot of the host system state to assist in local trail identifier assignments. System Snapshot Forwarder 409 periodically forwards system snapshots to the central service 100 to identify live entities in (distributed) execution trails. Metrics Forwarder 410 periodically forwards agent metrics to the central service 100 to demonstrate agent resource consumption to end users. Discovery Event Forwarder 411 forwards a heartbeat to the central service 100 to assist in agent discovery, failure detection, and recovery.

Figure 5:
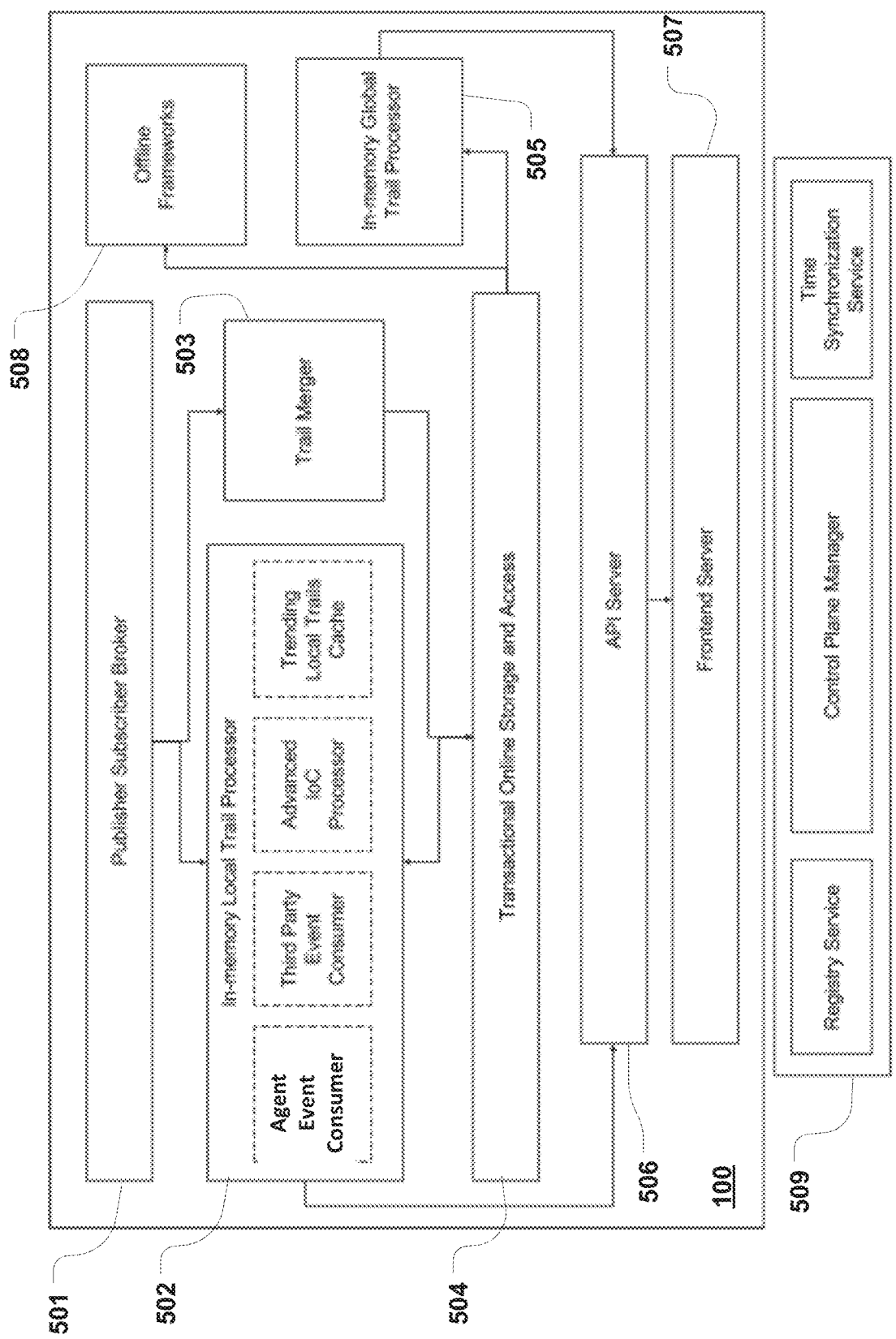
FIG. 5 depicts one implementation of a central service architecture in an attack progression tracking system.

FIG. 5 depicts an example architecture of the central service 100. In one implementation, unlike agent modules that are deployed on host/guest operating systems, central service 100 modules are scoped inside a software managed service. The central service 100 includes primarily online modules, as well as offline frameworks. The online modules of the central service 100 will now be described.

Publisher/Subscriber Broker 501 provides horizontally scalable persistent logging of execution trail events published from agents and third-party solutions that forward events tagged with host operating system information. In-memory Local Trail Processor 502 is a horizontally scalable in-memory component that is responsible for the consumption of local trail events that are associated with individual agents and received via the Publisher/Subscriber Broker 501. In-memory Local Trail Processor 502 also consumes third party solution events, which are applied to local trails. In-memory Local Trail Processor 502 further includes an in-memory local trail deep processor subcomponent with advanced IoC processing, in which complex behavior detection functions are used to determine IoCs at multi-depth sub-local trail levels. Such deep processing also includes sub-partitioning of local trails to assist in lightweight visualizations, risk scoring of IoC subpartitions, and re-scoring of local trails as needed. In addition, In-memory Local Trail Processor 502 includes a trending trails cache that serves a set of local trail data (e.g., for top N local trails) in multiple formats, as needed for front end data visualization.

Trail Merger 503 performs stateful unification of local trails across multiple agents to form global trails. This can include the explicit continuation of trails (to form global trails) based on scenarios of inter-host operating system process communication and scenarios of inter-host operating system manipulation of artifacts (e.g., process in <"host": "B", "local trail":"123"> uses a network shared file that is part of <"host":"A", "local trail":"237">). Trail Merger 503 assigns unique identifiers to global trails and assigns membership to the underlying local trails.

Transactional Storage and Access Layer 504 is a horizontally-scalable, consistent, transactional, replicated source of truth for local and global execution trails, provision for flexible schema, flexible indexing, low latency Create/Read/ Update operations, time to live semantics, and time range partitioning. In-memory Global Trail Processor 505 uses change data captured from underlying transactional storage to rescore global trails when their underlying local trails are rescored. This module is responsible for forwarding responses to agents on affected hosts, and also maintains a (horizontally-scalable) retain-best cache for a set of global trails (e.g., top N trails). API Server 506 follows a pull model to periodically retrieve hierarchical representations of the set of top N trails (self-contained local trails as well as underlying local trails forming global trails). API Server 506 also serves as a spectator of the cache and storage layer control plane. Frontend Server 507 provides a user-facing web application that provides the visualization functionality described herein.

Central service 100 further includes Offline Frameworks 508, including a behavioral model builder, which ingests incremental snapshots of trail edges from a storage engine and creates probabilistic n-gram models of intra-host process executions, local and network file manipulations, intra- and cross-host process connections. This framework supports API parallelization as well as horizontal scalability. Offline Frameworks 508 further include search and offline reports components to support search and reporting APIs, if required. This framework supports API parallelization as well as horizontal scalability.

Auxiliary Modules 509 in the central service 100 include a Registry Service that serves as a source of truth configuration store for global and local execution trail schemas, static IoC functions, and learned IoC behavioral models; a Control Plane Manager that provides automatic assignment of in-memory processors across multiple servers, agent failure detection and recovery, dynamic addition of new agents, and bootstrapping of in-memory processors; and a third party Time Synchronization Service that provides consistent and accurate time references to a distributed transactional storage and access layer, if required.

Connection Tracing

Because attacks progress gradually across multiple systems, it is difficult to map which security violations are related on distributed infrastructure. Whereas human analysts would normally manually stitch risk signals together through a labor-intensive process, the presently described attack progression tracking system facilitates the identification of connected events.

In modern systems, a process often communicates with another process via connection-oriented protocols. This involves (1) an initiator creating a connection and (2) a listener accepting the request. Once a connection is established, the two processes can send and/or receive data between them. An example of this is the TCP connection protocol. One powerful way to monitor an attacker's movement across infrastructure is to closely follow the connections between processes. In other words, the connections between processes can be identified, it is possible to determine how the attacker has advanced through the infrastructure.

Agents match connecting processes by instrumenting connect and accept system calls on an operating system. These events are represented in an execution graph as edges. Such edges are referred to herein as "atomic" edges, because there is a one-to-one mapping between a system call and an edge. Agents are able to follow two kinds of connections: local and network. Using a TCP network connection as an example, an agent from host A instruments a connect system call from process X, producing a mapping:

X→<senderIP:senderPort,receiverIP:receiverPort>

The agent from host B instruments an accept system call from process Y, producing a mapping:

Y<senderIP:senderPort,receiverIP:receiverPort>

The central service, upon receiving events from both agents A and B, determines that there is a matching relationship between the connect and accept calls, and records the connection mapping between X→Y.

Now, using a Unix domain socket local host connection as an example, an agent from host A instruments a connect system call from process X, producing a mapping:

X→<socket path, kaddr sender struct, kaddr receiver struct>

Here, kaddr refers to the kernel address of the internal address struct, each unique per sender and receiver at the time of connection. The agent from the same host A instruments an accept system call from process Y, producing a mapping:

Y→<socket path, kaddr sender struct, kaddr receiver struct>

The central service, upon receiving both events from agent A, determines that there is a matching relationship between the connect and accept calls, and records the connection mapping between X→Y.

Figure 6:
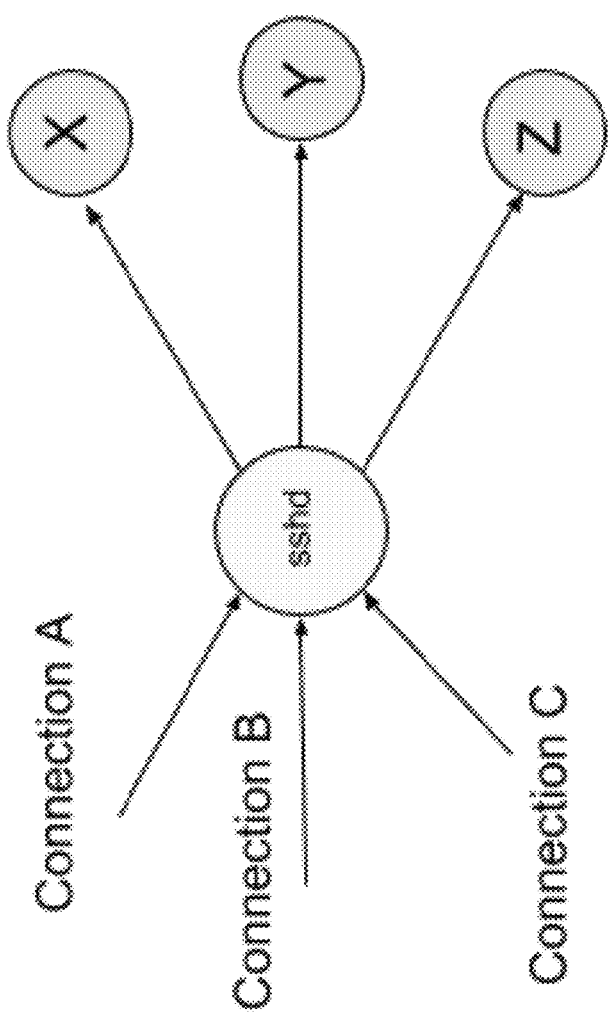
FIG. 6 depicts example connection multiplexing and resulting processes.

Many network-facing processes follow the pattern of operating as a server. A server process accepts many connections simultaneously and performs actions that are requested by the clients. In this particular case, there is a multiplexing relationship between incoming connections and their subsequent actions. As shown in FIG. 6, a secure shell daemon (sshd) accepts three independent connections (connections A, B, and C), and opens three individual sessions (processes X, Y, and Z). Without further information, an agent cannot determine exactly which incoming connections cause which actions (processes). The agent addresses this problem by using "implied" edges. Implied edges are different from atomic edges, in that they are produced after observing a certain number N of system events. Agents are configured with state machines that are advanced as matching events are observed at different stages. When a state machine reaches a terminal state, an implied edge is produced. If the state machine does not terminate by a certain number M of events, the tracked state is discarded.

There are two implied edge types that are produced by agents: hands-off implied edges and session-for implied edges. A hands-off implied edge is produced when an agent observes that a parent process clones a child process with an intent to handing over a network socket that it received. More specifically, an agent looks for the following behaviors using its state machine:

1) Parent process accepts a connection,
2) As a result of the accept ( ), the parent process obtains a file descriptor.
3) Parent process forks a child process.
4) The file descriptor from the parent is closed, leaving only the duplicate file descriptor of the child accessible.

A session-for implied edge is produced when an agent observes a worker thread taking over a network socket that has been received by another thread (typically, the main thread). More specifically, an agent looks for the following behaviors using its state machine:

1) The main thread from a server accepts a connection and obtains a file descriptor.
2) One of the worker threads from the same process starts read ( ) or recvfrom ( ) (or analogous functions) on the file descriptor.

To summarize, using the foregoing techniques, agents can identify relationships between processes initiating connections and subsequent processes instantiated through multiplexing servers by instrumenting which process or thread is handed an existing network socket.

The central service can consume the atomic and the implied edges to create a trail that tracks the movement of an attacker, which is, in essence, a subset of all the connections that are occurring between processes. The central service has an efficient logic which follows a state transition, as well. By employing both of the techniques above, it can advance the following state machine:

1) Wait for a connect ( ) or accept ( ), record event (e.g., in hash table).
2) Wait for matching connect ( ) or accept ( ).
3) If the proximity of the timestamps of the events is within a threshold, record as a match between sender and receiver.
4) Optionally, wait for an additional implied edge.
5) If the implied edge arrives within a threshold amount of time, record as a match between a sender and a subsequent action.

Execution Trail Identification

Figure 7:
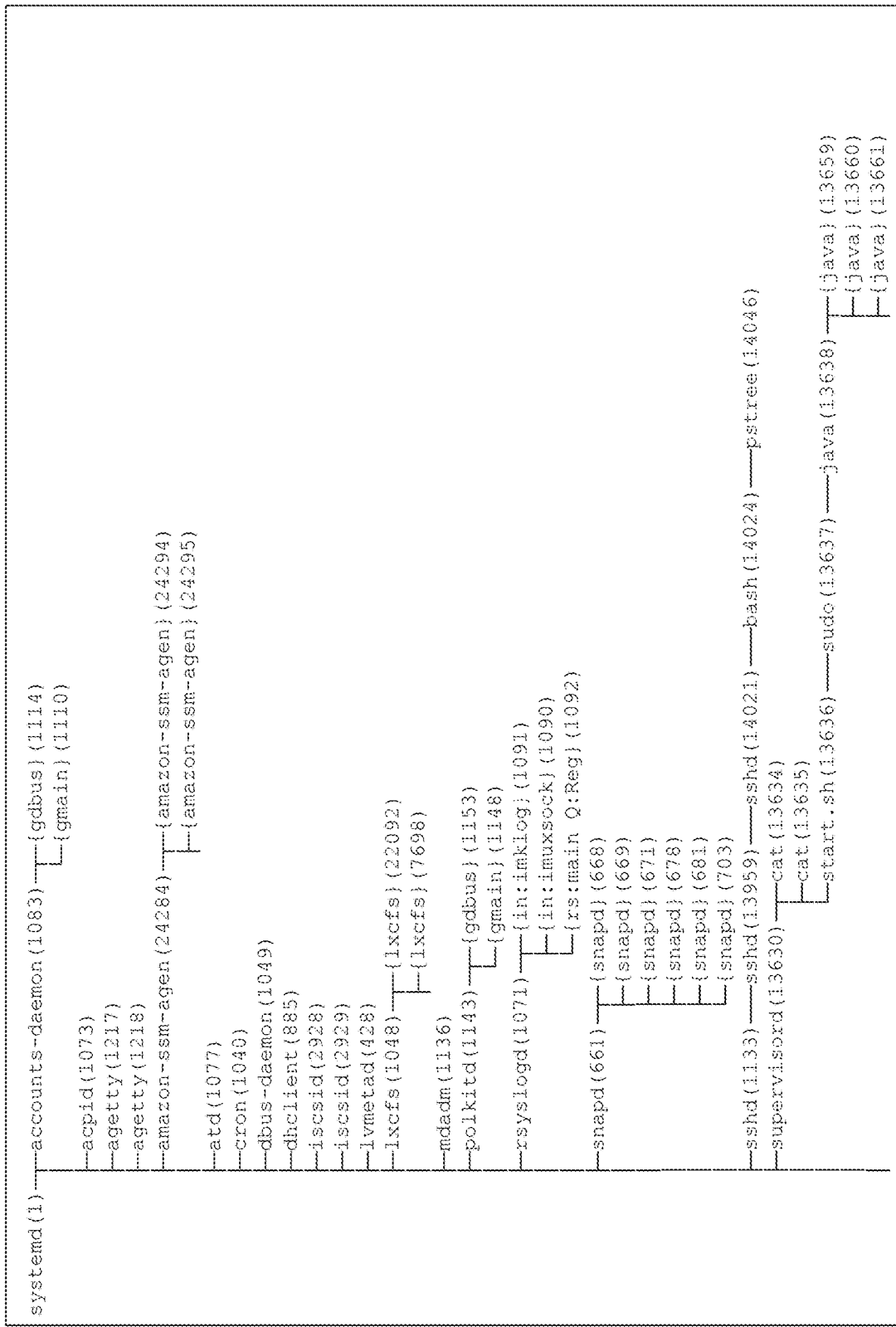
FIG. 7 depicts an example process tree dump on a Linux operating system.

The execution graphs each agent produces can be extensive in depth and width, considering they track events for a multitude of processes executing on an operating system. To emphasize this, FIG. 7 depicts a process tree dump for a single Linux host. An agent operating on such a host would instrument the system calls associated with the numerous processes. Further still, there are usually multiple daemons servicing different requests throughout the lifecycle of a system.

A large execution graph is difficult to process for two reasons. First, the virtually unbounded number of vertices and edges prevents efficient pattern matching. Second, grouping functionally unrelated tasks together may produce false signals during security analysis. To process the execution graph more effectively, the present system partitions the graph into one or more execution trails. In some implementations, the graph is partitioned such that each execution trail (subgraph) represents a single intent or a single unit of work. An "intent" can be a particular purpose, for example, starting a file transfer protocol (FTP) session to download a file, or applying a set of firewall rules. A "unit of work" can be a particular action, such as a executing a scheduled task, or executing a process in response to a request.

Figure 8:
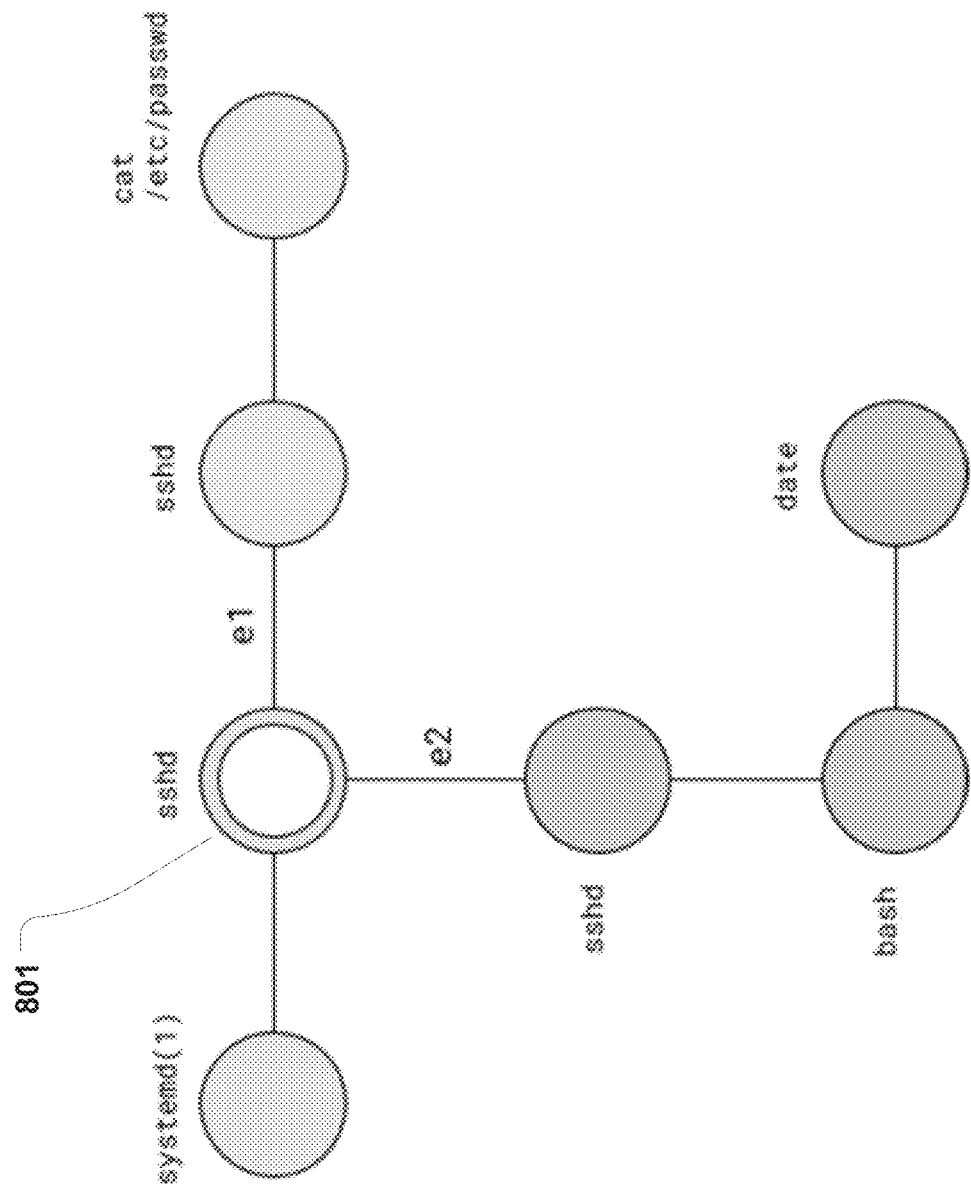
FIG. 8 depicts an example of partitioning an execution graph.

"Apex points" are used to delineate separate, independent partitions in an execution graph. Because process relationships are hierarchical in nature, a convergence point can be defined in the graph such that any subtree formed afterward is considered a separate independent partition (trail). As such, an Apex point is, in essence, a breaking point in an execution graph. FIG. 8 provides an example of this concept, in which a secure shell daemon (sshd) 801 services two sessions e1 and e2. Session e1 is reading the/etc/passwd file, whereas the other session e2 is checking the current date and time. There is a high chance that these two sessions belong to different individuals with independent intents. The same logic applies for subsequent sessions created by the sshd 801.

A process is determined to be an Apex point if it produces sub-graphs that are independent of each other. In one implementation, the following rules are used to determine whether an Apex point exists: (1) the process is owned directly by the initialization process for the operating system (e.g., the "init" process); or (2) the process has accepted a connection (e.g., the process has called accept ( ) on a socket (TCP, UDP, Unix domain, etc.)). If a process meets one of the foregoing qualification rules, it is likely to be servicing an external request. Heuristically speaking, it is highly that such processes would produce subgraphs with different intents (e.g., independent actions caused by different requests).

Risk Scoring

Figure 9:
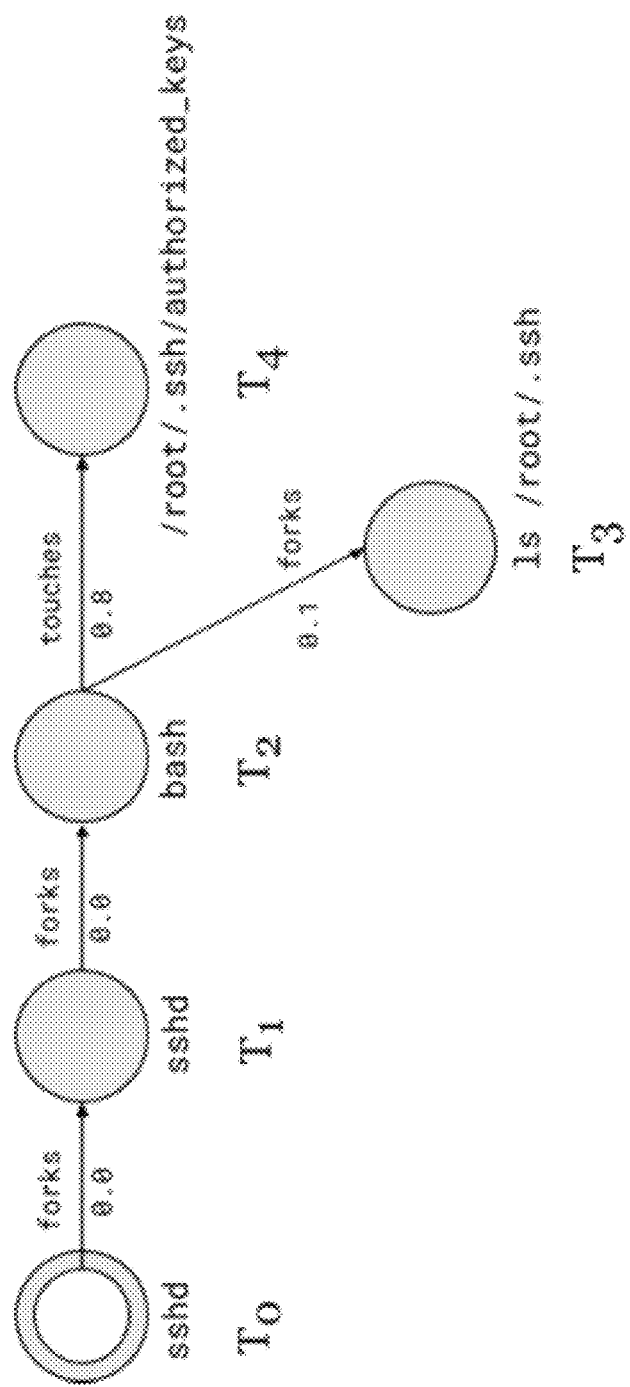
FIG. 9 depicts an example of risking scoring an execution trail.

After the execution graphs are partitioned as individual trails, security risks associated with each subgraph can be identified. Risk identification can be performed by the central service and/or individual agents. FIG. 9 is an execution graph mapping a sequence of action for a particular trail happening across times $T_0$ to $T_4$. At $T_0$, sshd forks a new sshd session process, which, at $T_1$, forks a shell process (bash). At $T_3$, a directory listing command (ls) is executed in the shell. At $T_4$, the /root/.ssh/authorized_keys file is accessed. The central service processes the vertices and edges of the execution graph and can identify malicious activities on four different dimensions: (1) frequency: is something repeated over a threshold number of times?; (2) edge: does a single edge match a behavior associated with risk?; (3) path: does a path in the graph match a behavior associated with risk?; and (4) cluster: does a cluster (subtree) in the graph contain elements associated with risk?

Risks can be identified using predefined sets of rules, heuristics, machine learning, or other techniques. Identified risky behavior (e.g., behavior that matches a particular rule, or is similar to a learned malicious behavior) can have an associated risk score, with behaviors that are more suspicious or more likely to malicious having higher risk scores than activities that may be relatively benign. In one implementation, rules provided as input to the system are sets of one or more conditional expressions that express system level behaviors based on operating system call event parameters. These conditions can be parsed into abstract syntax trees. In some instances, when the conditions of a rule are satisfied, the matching behavior is marked as an IoC, and the score associated with the rule is applied to the marked behavior. The score can be a predefined value (see examples below). The score can be defined by a category (e.g., low risk, medium risk, high risk), with higher risk categories having higher associated risk scores.

The rules can be structured in a manner that analyzes system level activities on one or more of the above dimensions. For example, a frequency rule can include a single conditional expression that expresses a source process invoking a certain event multiple times aggregated within a single time bucket and observed across a window comprising multiple time buckets. As graph events are received at the central service from individual agents, frequencies of events matching the expressions can be cached and analyzed online. Another example is an event (edge) rule, which can include a single conditional expression that expresses an event between two entities, such as process/thread manipulating process, process/thread manipulating file, process/thread manipulating network addresses, and so on. As graph events are streamed from individual sensors to the central service, each event can be subjected to such event rules for condition match within time buckets. As a further example, a path rule includes multiple conditional expressions with the intent that a subset of events taking place within a single path in a graph demonstrate the behaviors encoded in the expressions. As events are streamed into the central service, a unique algorithm can cache the prefix expressions. Whenever an end expression for the rule is matched by an event, further asynchronous analysis can be performed over all cached expressions to check whether they are on the same path of the graph. An identified path can be, for example, process A executing process B, process C executing process D, and so on. Another example is a cluster rule, which includes multiple conditional expressions with the intent that a subset of events taking place across different paths in a graph demonstrates the behaviors encoded in the expressions. Lowest common ancestors can be determined across the events matching the expressions. One of skill will appreciate the numerous ways in which risks can be identified and scored.

As risks are identified, the central service tracks the risk score at the trail level. Table 1 presents a simple example of how a risk score accumulates over time, using simple edge risks, resulting in a total risk for the execution trail of 0.9.

TABLE 1

| Time | Risk Score | Event Description |
| --- | --- | --- |
| $T_0$ | 0.0 | Process is owned by init, likely harmless |
| $T_1$ | 0.0 | New ssh session |
| $T_2$ | 0.0 | Bash process, likely harmless |
| $T_3$ | 0.1 (+0.1) | View root/.ssh dir - potentially suspicious |
| $T_4$ | 0.9 (+0.8) | Modification of authorized_keys - potentially malicious |

In some implementations, risk scores for IoCs are accumulated to the underlying trails as follows. Certain IoCs are considered "anchor" IoCs (i.e., IoCs that are independently associated with risk), and the risk scores of such anchor IoCs are added to the underlying trail when detected. The scores of "dependent" IoCs are not added to the underlying trail if an anchor IoC has not previously been observed for the trail. A qualifying anchor IoC can be observed on the same machine or, if the trail has laterally moved, on a different machine. For example, the score of a privilege escalation function like sudo su may not get added to the corresponding trail unless the trail has seen an anchor IoC. Finally, the scores of "contextual" IoCs are not accumulated to a trail until the score of the trail has reached a particular threshold.

Global Trails

Using the connection matching techniques described above, the central service can form a larger context among multiple systems in an infrastructure. That is, the central service can piece together the connected trails to form a larger aggregated trail (i.e., a global trail). For example, referring back to FIG. 3, if a process from trail 201 (on the host associated with agent A) makes a connection to a process from trail 203 (on the host associated with agent C), the central service aggregates the two trails in a global trail 301. The risk scores from each local trail 201 and 203 (as well as 202) can be combined to form a risk score for the new global trail 301. In one implementation, the risk scores from the local trails 201, 202, and 203 are added together to form the risk score for the global trail 301. Global trails form the basis for the security insights provided by the system. By highlighting the global trails with a high-risk score, the system can alert and recommend actions to end users (e.g., security analysts).

Risk Influence Transfer

Figure 10:
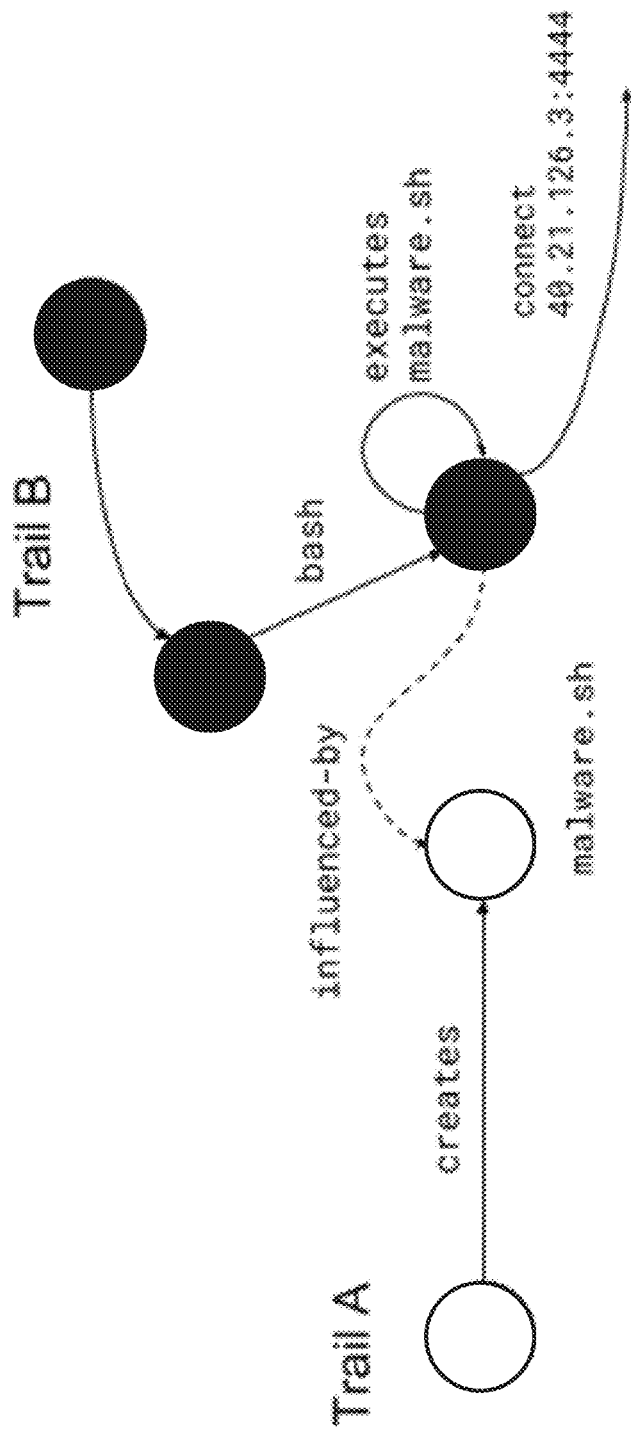
FIG. 10 depicts an example of an influence relationship between execution trails.

The partitioned trails in the execution graphs are independent in nature, but this is not to say that they do not interact with each other. On the contrary, the risk score of one trail can be affected by the "influence" of another trail. With reference to FIG. 10, consider the following example. Trail A (containing the nodes represented as circle outlines) creates a malicious script called malware.sh, and, at a later time, a different trail, Trail B (containing the nodes represented as solid black circles) executes the script. Although the two Trails A and B are independent of each other, Trail B is at least as risky as Trail A (because Trail B is using the script that Trail A has created). This is referred to herein as an "influence-by" relationship.

In one implementation, a trail is "influenced" by the risk score associated with another trail when the first trail executes or opens an artifact produced by the other trail (in some instances, opening an artifact includes accessing, modifying, copying, moving, deleting, and/or other actions taken with respect to the artifact). When the influence-by relationship is formed, the following formula is used so that the risk score of influencer is absorbed.

$$RB = (1-\alpha) \cdot RB + \alpha \cdot \text{Rinfluencer} \qquad \text{Equation 1}$$

In the above formula, RB is the risk score associated with Trail B, Rinfluencer is the risk score associated with the influencer (malware script), and a is a weighting factor between 0 and 1.0. The exact value of a can be tuned per installation and desired sensitivity. The general concept of the foregoing is to use a weighted running average (e.g., exponential averaging) to retain a certain amount of the risk score of the existing trail (here, Trail B), and absorb a certain amount of risk score from the influencer (here, malware.sh).

Two risk transfers occur in FIG. 10: (1) a transfer of risk between Trail A and a file artifact (malware.sh) during creation of the artifact, and (2) a transfer of risk between the file artifact (malware.sh) and Trail B during execution of the artifact. When an artifact (e.g., a file) is created or modified (or, in some implementations, another action is taken with respect to the artifact), the risk score of the trail is absorbed into the artifact. Each artifact maintains its own base risk score based on the creation/modification history of the artifact.

Figure 11:
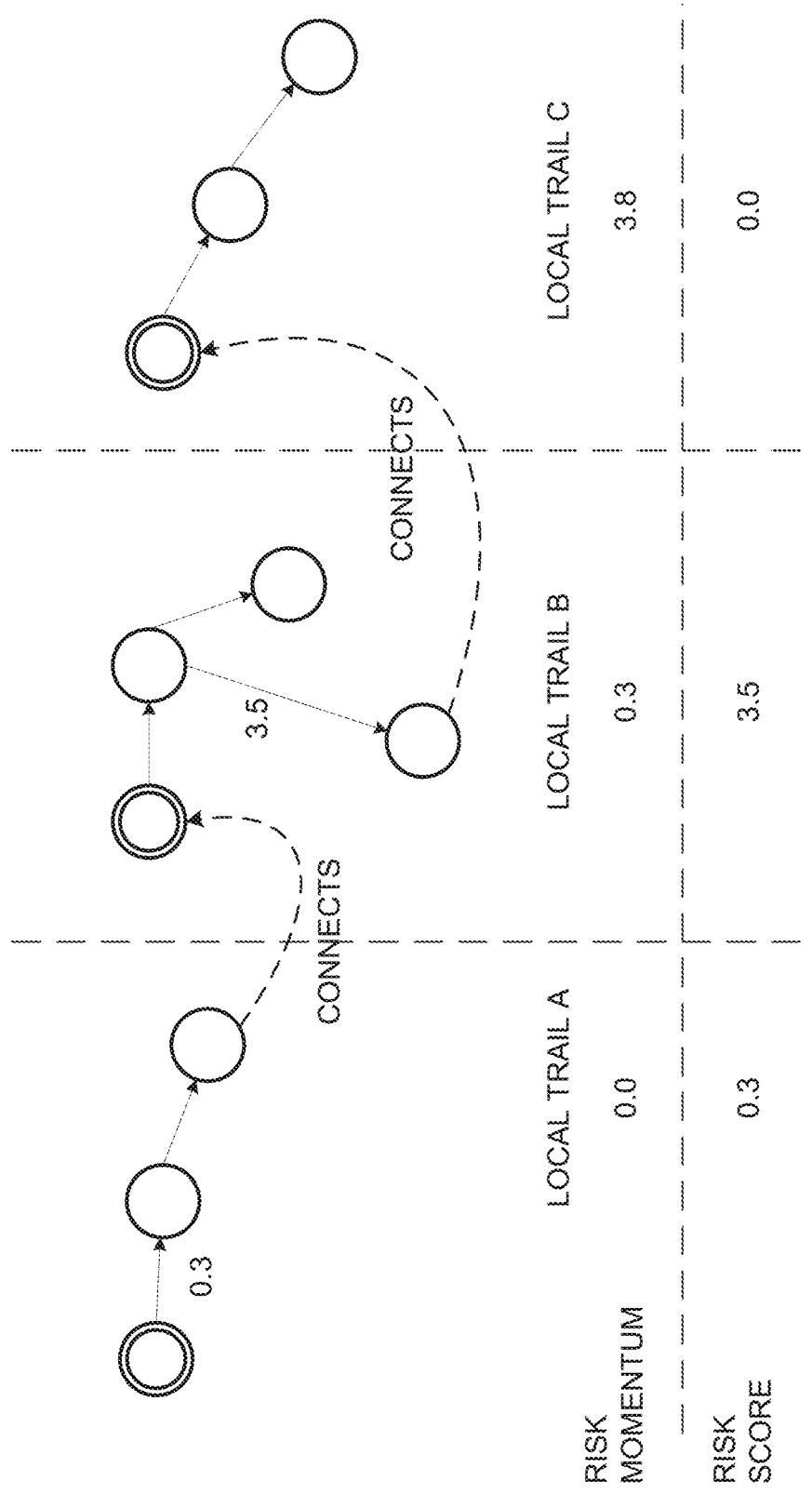
FIG. 11 depicts an example of risk momentum across multiple execution trails.

To further understand how trail risk transfer is performed, the concept of "risk momentum" will now be explained. Risk momentum is a supplemental metric that describes the risk that has accumulated thus far beyond a current local trail. In other words, it is the total combined score for the global trail. An example of risk momentum is illustrated in FIG. 11. As shown, Local Trail A, Local Trail B, and Local Trail C are connected to form a continuous global execution trail. Using the techniques described above, Local Trail A is assigned a risk score of 0.3 and Local Trail B has a risk score of 3.5. Traversing the global execution trail, the risk momentum at Local Trail B is 0.3, which is the accumulation of the risk scores of preceding trails (i.e., Local Trail A). Going further, the risk momentum at Local Trail C is 3.8, which is the accumulation of the risk scores of preceding Local Trails A and B.

It is possible that a local execution trail does not exhibit any risky behavior, but its preceding trails have accumulated substantial risky behaviors. In that situation, the local execution trail has a low (or zero) risk score but has a high momentum. For example, referring back to FIG. 11, Local Trail C has a risk score of zero, but has a risk momentum of 3.8. For this reason, both the risk momentum and risk score are considered when transferring risk to an artifact. In one implementation, risk is transferred to an artifact using the following formula:

$$\text{ArtifactBase} = (\text{RiskMomentum} + \text{RiskScore}) \cdot \beta \qquad \text{Equation 2}$$

That is, the base risk score for an artifact (ArtifactBase) is calculated by multiplying a constant β to the sum of the current risk momentum (RiskMomentum) and risk score of the current execution trail (RiskScore). β is a weighting factor, typically between 0.0 and 1.0. Using the above equation, a local execution trail may not exhibit risky behavior as a given moment, but such trail can still produce a non-zero artifact base score in the risk momentum is non-zero.

A trail that then accesses or executes an artifact is influenced by the base score of the artifact, per Equation 1, above (Rinfluencer is the artifact base score). Accordingly, although trails are partitioned in nature, risk scores are absorbed and transferred to each other through influence-by relationships, which results in the system providing an accurate and useful depiction of how risk behaviors propagate through infrastructure.

Multimodal Sources

In one implementation, the present system includes a multimodal security middleware architecture enhances execution graphs by supplementing the graphs with detection function results derived from multiple sources rather than a single source (e.g., events identified by agents executing on host systems). The multimodal security middleware is responsible for enhancing activity postures into security postures, in online, real-time, as well as near-real time fashion. Multimodal sources can include (1) rule based online graph processing analytics, (2) machine learning based anomaly detection, (3) security events reported from host operating systems, (4) external threat intelligence feeds, and (5) preexisting silo security solutions in an infrastructure. Detection results from each of these sources can be applied to the underlying trails, thereby contributing to the riskiness of an execution sequence developing towards an attack progression. Being multimodal, if an activity subset within an execution trail is detected as an indicator of compromise by multiple sources, the probability of false positives on that indicator of compromise is lowered significantly. Moreover, the multimodal architecture ensures that the probability of overlooking an indicator of compromise is low, as such indicators will often be identified by multiple sources. A further advantage of the multimodal architecture is that specific behaviors that cannot be expressed generically, such as whether a host should communicate to a particular target IP address, or whether a particular user should ever log in to a particular server, can be reliability detected by the system.

In one implementation, the multimodal middleware includes an online component and a nearline component. Referring back to FIG. 5, the online and nearline components can be included in In-memory Local Trail Processor 502. The online component includes a rule-based graph analytic processor subcomponent and a machine learning based anomaly detector subcomponent. The nearline component consumes external third-party information, such as third-party detection results and external threat intelligence feeds. As execution trails are modeled using host and network-based entity relationships, they are processed by the rule-based processor and machine learning based anomaly detector, which immediately assign risk scores to single events or sets of events. Information from the nearline components are mapped back to the execution trails in a more asynchronous manner to re-evaluate their scores. Some or all of the sources of information can contribute to the overall score of the applicable execution trails to which the information is applicable.

Security information from external solutions are ingested by the nearline component, and the middleware contextualizes the information with data obtained from sensors. For example, a firewall alert can take the form source ip:source port to target ip:target port traffic denied. The middleware ingests this alert and searches for a process network socket relationship from the subgraph, where the network socket matches the above source ip:source port, target ip:target port. From this, the middleware is able to determine to which trail to map the security event. The score of the event can be derived from the priority of the security information indicated by the external solution from which the information was obtained. For example, if the priority is "high", a high risk score can be associated with the event and accumulated to the associated trail.

Operating systems generally have internal detection capabilities. The middleware can ingest security events reported from host operating systems in the same manner described above with respect to the security information obtained from external solutions. The nearline component of the middleware is also able to ingest external threat intelligence feeds, such as alerts identifying process binary names, files, or network IP addresses as suspicious. The middleware can contextualize information received from the feeds by querying entity relationships to determine which events in which trails are impacted by the information. For example, if a particular network IP address is blacklisted, each trail containing an event associated with the IP (e.g., process connects to a socket where the remote IP address is the blacklisted address) can be rescored based on a priority set by the feed provider.

Within the online component, the rule-based graph stream processing analytics subcomponent works inline with streams of graph events that are emitted by system event tracking sensors executing on operating systems. This subcomponent receives a set of rules as input, where each rule is a set of one or more conditional expressions that express system level behaviors based on OS system call event parameters. The rules can take various forms, as described above.

The machine learning based anomaly detection subcomponent will now be described. In some instances, depending on workloads, certain behavioral rules cannot be generically applied on all hosts. For example, launching a suspicious network tool may be a malicious event generally, but it may be the case that certain workloads on certain enterprise servers are required to launch the tool. This subcomponent attempts to detect anomalies as well as non-anomalies by learning baseline behavior from each individual host operating system over time. It is to be appreciated that various known machine learning and heuristic techniques can be used to identify numerous types of anomalous and normal behaviors. Behaviors detected by the subcomponent can be in the form of, for example, whether a set of events are anomalous or not (e.g., whether process A launching process B is an anomaly when compared against the baseline behavior of all process relationships exhibited by a monitored machine). This detection method is useful in homogenous workload environments, where deviation from fixed workloads is not expected. Detected behaviors can also be in the form of network traffic anomalies (e.g., whether a host should communicate or receive communicate from a particular IP address) and execution anomalies (e.g., whether a source binary A should directly spawn a binary B, whether some descendant of source binary A should ever spawn binary B, etc.). The machine learning based anomaly detection subcomponent provides a score for anomalies based on the standard deviation from a regression model. The score of a detected anomaly can be directly accumulated to the underlying trail.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 12:
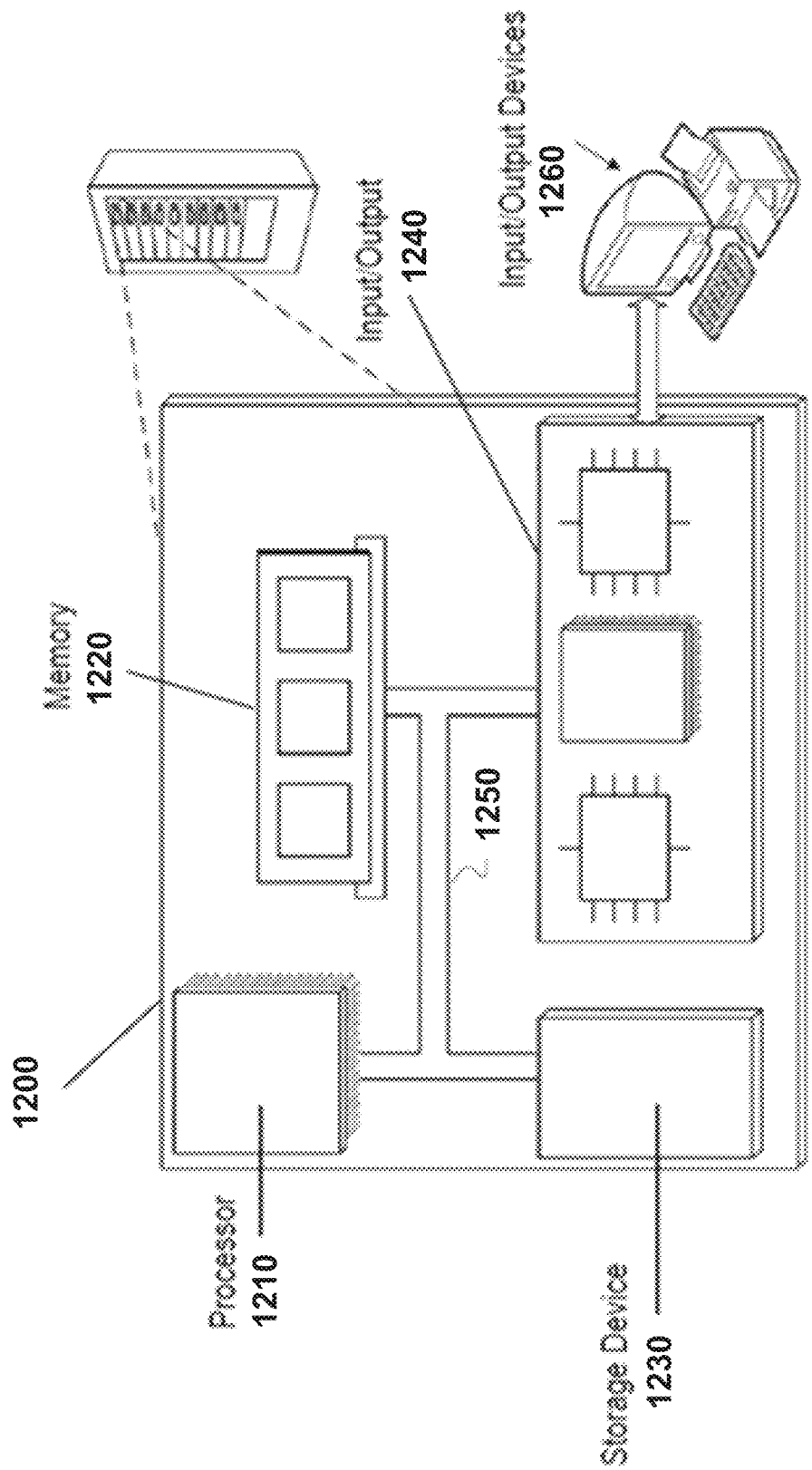
FIG. 12 depicts a block diagram of an example computer system.

FIG. 12 is a block diagram of an example computer system 1200 that may be used in implementing the technology described in this document. General-purpose computers, network appliances, mobile devices, or other electronic systems may also include at least portions of the system 1200. The system 1200 includes a processor 1210, a memory 1220, a storage device 1230, and an input/output device 1240. Each of the components 1210, 1220, 1230, and 1240 may be interconnected, for example, using a system bus 1250. The processor 1210 is capable of processing instructions for execution within the system 1200. In some implementations, the processor 1210 is a single-threaded processor. In some implementations, the processor 1210 is a multi-threaded processor. The processor 1210 is capable of processing instructions stored in the memory 1220 or on the storage device 1230.

The memory 1220 stores information within the system 1200. In some implementations, the memory 1220 is a non-transitory computer-readable medium. In some implementations, the memory 1220 is a volatile memory unit. In some implementations, the memory 1220 is a non-volatile memory unit.

The storage device 1230 is capable of providing mass storage for the system 1200. In some implementations, the storage device 1230 is a non-transitory computer-readable medium. In various different implementations, the storage device 1230 may include, for example, a hard disk device, an optical disk device, a solid-date drive, a flash drive, or some other large capacity storage device. For example, the storage device may store long-term data (e.g., database data, file system data, etc.). The input/output device 1240 provides input/output operations for the system 1200. In some implementations, the input/output device 1240 may include one or more of a network interface device, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1260. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1230 may be implemented in a distributed way over a network, such as a server farm or a set of widely distributed servers, or may be implemented in a single computing device.

Although an example processing system has been described in FIG. 12, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A computer-implemented method for identifying relationships among infrastructure security-related events, the method comprising:
   monitoring, by a plurality of software agents deployed on respective operating systems in an infrastructure, system level activities associated with the respective operating systems; and
   constructing, based on the system level activities, an execution graph comprising one or more execution trails, wherein the constructing comprises:
      creating a first node in the execution graph representing a first entity monitored by one of the software agents, wherein the first entity comprises a first process;
      creating a second node in the execution graph representing a second entity monitored by one of the software agents, wherein the second entity comprises a second process;
      identifying, based on the monitored system level activities, a relationship between the first entity and the second entity, wherein identifying the relationship between the first entity and the second entity comprises:
         identifying, by one of the software agents, a first system call to initiate a connection by the first process;
         identifying, by one of the software agents, a second system call to accept a connection by the second process; and
         matching, based on the first system call and the second system call, the connection initiated by the first process and the connection accepted by the second process; and
      recording the relationship as an edge between the first node and the second node in the execution graph.

2. The method of claim 1, wherein the execution graph comprises a plurality of nodes and a plurality of edges connecting the nodes, wherein each node represents an entity comprising a process or an artifact, and wherein each edge represents an event associated with an entity.

3. The method of claim 2, wherein a plurality of edges in the execution graph are atomic such that there is a one-to-one mapping between each such edge and a system call identified in the system level activities.

4. The method of claim 2, wherein a plurality of edges in the execution graph are implied in that each such edge is created following the observation of a predefined set of events.

5. The method of claim 1, wherein the system level activities comprise (i) systems calls to initiate connections and (ii) system calls to accept connections.

6. The method of claim 1, wherein the connection comprises a network connection between the first process executing on a first one of the operating systems and the second process executing on a second one of the operating systems.

7. The method of claim 1, wherein the connection comprises a local connection between the first process and the second process each executing on a same operating system.

8. The method of claim 1, wherein identifying the relationship between the first entity and the second entity comprises determining that a parent process has handed off, to a child process, a connection accepted by the parent process.

9. The method of claim 1, wherein identifying the relationship between the first entity and the second entity comprises determining that one thread has taken over a connection accepted by a different thread.

10. A system for identifying relationships among infrastructure security-related events, the system comprising:
   a processor; and
   a memory storing computer-executable instructions that, when executed by the processor, program the processor to perform the operations of:
      monitoring, by a plurality of software agents deployed on respective operating systems in an infrastructure, system level activities associated with the respective operating systems; and
      constructing, based on the system level activities, an execution graph comprising one or more execution trails, wherein the constructing comprises:
         creating a first node in the execution graph representing a first entity monitored by one of the software agents, wherein the first entity comprises a first process;
         creating a second node in the execution graph representing a second entity monitored by one of the software agents, wherein the second entity comprises a second process;
         identifying, based on the monitored system level activities, a relationship between the first entity and the second entity, wherein identifying the relationship between the first entity and the second entity comprises:
            identifying, by one of the software agents, a first system call to initiate a connection by the first process;
            identifying, by one of the software agents, a second system call to accept a connection by the second process; and
            matching, based on the first system call and the second system call, the connection initiated by the first process and the connection accepted by the second process; and
         recording the relationship as an edge between the first node and the second node in the execution graph.

11. The system of claim 10, wherein the execution graph comprises a plurality of nodes and a plurality of edges connecting the nodes, wherein each node represents an entity comprising a process or an artifact, and wherein each edge represents an event associated with an entity.

12. The system of claim 11, wherein a plurality of edges in the execution graph are atomic such that there is a one-to-one mapping between each such edge and a system call identified in the system level activities.

13. The system of claim 11, wherein a plurality of edges in the execution graph are implied in that each such edge is created following the observation of a predefined set of events.

14. The system of claim 10, wherein the system level activities comprise (i) systems calls to initiate connections and (ii) system calls to accept connections.

15. The system of claim 10, wherein the connection comprises a network connection between the first process executing on a first one of the operating systems and the second process executing on a second one of the operating systems.

16. The system of claim 10, wherein the connection comprises a local connection between the first process and the second process each executing on a same operating system.

17. The system of claim 10, wherein identifying the relationship between the first entity and the second entity comprises determining that a parent process has handed off, to a child process, a connection accepted by the parent process.

18. The system of claim 10, wherein identifying the relationship between the first entity and the second entity comprises determining that one thread has taken over a connection accepted by a different thread.

* * * * *